Aug. 24, 1948.  E. H. KOCHER  2,447,509

LUBRICATION

Filed Aug. 3, 1940

Inventor,
EDWARD H KOCHER.
By Dean Fairbank & Hirsch
Attorneys.

Patented Aug. 24, 1948

2,447,509

UNITED STATES PATENT OFFICE 2,447,509

LUBRICATION

Edward H. Kocher, Boonton, N. J., assignor to Auto Research Corporation, a corporation of Delaware Application August 3, 1940, Serial No. 350,653

3 Claims. (Cl. 184—6)

The present invention relates to lubrication and it particularly relates to concealed or internal lubrication installations in which lubricant is conducted in leak-proof fashion through and between internal bores or passageways in different parts or units of the mechanism and particularly, a machine tool such as a lathe.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

Associated with such junction or with the bearings will be high restriction metering fittings which will serve to proportion the quantity of lubricant supplied to the bearings.

Figure 1:
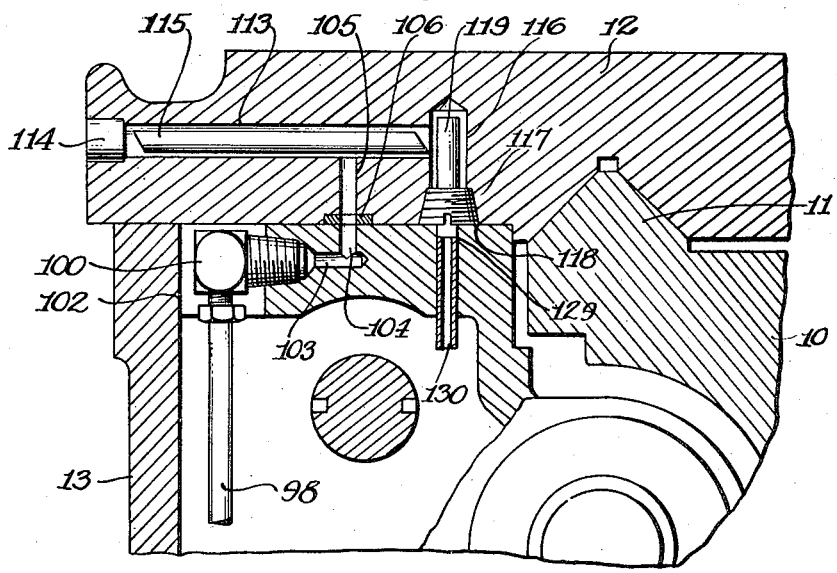
Figure 2:
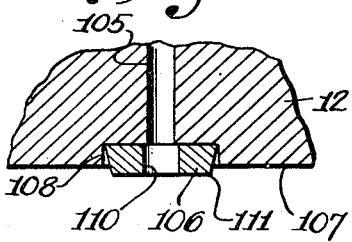
Figure 3:
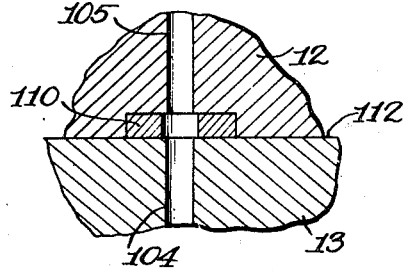

In the drawings, which show one of the various forms of the present invention, but to which the invention is by no means restricted, since many changes and alterations may be made therein; all within the scope of the present invention, Fig. 1 is a fragmentary section of a part of a lathe construction showing the seal between two sections of the lathe mechanism to prevent leakage of lubricant;

Figs. 2 and 3 are diagrammatic detail enlarged sectional views, indicating the manner of sealing the passages across the parts to be lubricated.

In Fig. 1, the base structure 10 carries the way 11 supporting the carriage 12. The carriage 12 is provided with an apron 13. The carriage 12 carries a transverse structure provided with a tool carrier (not shown).

As shown best in Fig. 1, the unrestricted pressure-feed tubing connection 98 and the junction 100 fit in the space 102 at the top of the apron and just below the carriage where it feeds the bore 103, which in turn connects to the transverse vertical bore 104. This vertical bore 104 communicates with bore 105 in the upper portion of the carriage structure with a lubricant-tight seal being made by the cork washer 106.

Figs. 2 and 3 show the manner of forming this seal in which one of the contacting faces 107, as shown in Fig. 2 is recessed at 108 around the bore 105 and receives a frusto-conical sealing washer 106 having a central bore 110.

It will be noted that the lower face 111 of this compressible washer 106 projects substantially below the face 107 of the carriage and the face 112 of the apron 13 is pressed up against the face 111 of the washer 106. When this happens, the washer 106 will be expanded sidewardly into the recess 108 to fill the same and form a lubricant-tight seal.

The compression and sealing of the gasket 106 takes place automatically upon assembly of the carriage and the apron and this avoids the need of tubing connections with the corresponding difficulty of assembling and disassembling such units. The washer 106 may be readily inserted in recess 108 without difficulty before assembly.

The bore 105 (see Fig. 1) communicates with the transverse passage 113, which is plugged at 114 and is substantially completely filled by the filler pin 115 having the oblique end faces. The bore 113 feeds the socket 116, the lower end of which is widened and threaded at 117 to receive the threaded head 118 of the flow metering fitting 119.

In the metering fitting 119, the lubricant flows toward the threaded head 118.

The threaded head 118 has a pipe thread so that when tightened it will automatically be lubricant tight.

The lubricant after passing the flow metering unit 119, as shown in Fig. 1, will be at relatively low pressure and it will not be necessary to provide a seal or gasket, such as 106. The lubricant will then drip directly into the recess 129 in the upper portion of the apron structure, which is provided with a depending drip pipe 130 which permits lubricant to drip upon one of the gear trains.

In operation, the lubricant will be fed under pressure from a pump (not shown) each time the carriage of the lathe is reversed. This will force lubricant into the tube 98 to the junction 100.

The lubricant from the junction unit 100 will flow past the metering fitting 119 to drip on one of the gear trains from the drip pipe 130.

It is thus apparent that the present applicant has provided a simple, ingenious oil distribution arrangement for a mechanism such as a machine tool or lathe.

The centralized lubricating equipment is substantially altogether concealed, as indicated in Fig. 1, and the construction is most compact and may be assembled on the apron carriage and cross slide without increasing the bulk or substantially increasing the cost of manufacture.

The tubing which is used is preferably for a bore of not more than ⅛ of an inch, so that there will be no tendency for the air bubbles to be trapped.

With the drilled passages, however, it is desirable to drill larger holes of larger diameter.

Since this presents the problem of trapping of air bubbles, it is desirable to utilize filler rods in such passageways of diameter of about 1/32 of an inch less than the drilled hole, as indicated, for example, at 115 in Fig. 1.

The provision of passageways which are so small as to prevent countercurrent flow of air and oil combined with check valves in each flow metering unit 119 will maintain the distributing tubing and bore system full of oil at all times both before and after the flow metering units, and in this way even a small quantity of oil discharged by the pump into distributing system will give a definite pressure rise before the flow metering outlet units, which pressure will rise as high as 40 to 50 pounds per square inch.

Even without the use of the filler rods 115, it will be possible to obtain a pressure of 5 to 8 pounds per square inch, which will assure the desired distribution of lubricant.

A divisional application Ser. No. 723,925, filed January 24, 1947, is directed to additional subject matter now cancelled from this application.

It will be understood that many changes could be made in the particular features of lathe as shown, and many apparently widely different embodiments of this invention could be made without departing from the scope thereof, and it is intended that all matter contained in the above description shall be interpreted as illustrative and not in a limiting sense.

What is claimed is:

1. In a machine lubricating installation, a bore system, having communicating bores across a machine structure, the end of one of said bores being recessed to receive a gasket and said gasket being of greater depth than the recess so that upon assembly of the parts it will be compressed into its recess, the inner face of said gasket substantially engaging the lateral wall of said recess, said gasket having oblique side walls spaced from and upon compression being expanded to tightly fit against said lateral wall of the recess.

2. In a machine tool lubricating installation, a pressure bore system, having communicating bores across a machine structure, the end of one of said bores being recessed to receive a gasket and said gasket being of greater depth than the recess so that upon assembly of the parts it will be compressed into its recess, the inner face of said gasket substantially engaging the lateral wall of said recess said gasket having oblique side walls spaced from and upon compression being expanded to tightly fit against said lateral wall of the recess, said gasket being of frusto-conical shape before compression.

3. In a machine tool lubricating installation, a pressure bore system, having communicating bores across a machine structure, the end of one of said bores being recessed to receive a gasket and said gasket being of greater depth than the recess so that upon assembly of the parts it will be compressed into its recess, the inner face of said gasket substantially engaging the lateral wall of said recess said gasket having oblique side walls spaced from and upon compression being expanded to tightly fit against said lateral wall of the recess, said gasket substantially completely filling said recess upon compression.

EDWARD H. KOCHER.

REFERENCES CITED

The following references are of record in the file of this patent:

UNITED STATES PATENTS

| Number | Name | Date |
| --- | --- | --- |
| 531,590 | Howells | Dec. 25, 1894 |
| 1,257,258 | Lemp | Feb. 19, 1918 |
| 1,497,503 | Greuter | June 10, 1924 |
| 1,771,301 | Kuder | July 22, 1930 |
| 1,797,547 | Class | Mar. 24, 1931 |
| 1,850,924 | Day | Mar. 22, 1932 |
| 1,862,488 | Bijur | June 7, 1932 |
| 1,885,222 | Boland | Nov. 1, 1932 |
| 1,911,450 | Kocher | May 30, 1933 |
| 1,944,828 | Robinson | Jan. 23, 1934 |
| 1,956,683 | Hewitt | May 1, 1934 |
| 1,975,920 | Bijur | Oct. 9, 1934 |
| 2,005,725 | Banfield | June 25, 1935 |
| 2,009,429 | Bijur | July 30, 1935 |
| 2,063,903 | Bijur | Dec. 15, 1936 |
| 2,070,574 | Bijur | Feb. 16, 1937 |
| 2,092,393 | Hewitt | Sept. 7, 1937 |
| 2,140,983 | Carter | Dec. 20, 1938 |

FOREIGN PATENTS

| Number | Country | Date |
| --- | --- | --- |
| 712,495 | France | July 21, 1931 |